(12) United States Patent
Balar et al.

(10) Patent No.: US 9,264,241 B2
(45) Date of Patent: Feb. 16, 2016

(54) SECURE WIRELESS NETWORK-BASED ACTIVATION FOR TABLE-SIDE INFORMATION AND POINT-OF-SALE DEVICES

(71) Applicant: Tabletop Media LLC, Dallas, TX (US)

(72) Inventors: Viren R. Balar, Murphy, TX (US); James T. Row, Dallas, TX (US); Bryan E. Campbell, Dallas, TX (US); Kevin C. Mowry, Dallas, TX (US); Tiegang Li, Plano, TX (US); Jeffrey E. Taylor, Lucas, TX (US)

(73) Assignee: Tabletop Media LLC, Dallas, TX (US)

( * ) Notice: Subject to any disclaimer, the term of this patent is extended or adjusted under 35 U.S.C. 154(b) by 119 days.

(21) Appl. No.: 14/151,696

(22) Filed: Jan. 9, 2014

(65) Prior Publication Data

US 2014/0192795 A1 Jul. 10, 2014

Related U.S. Application Data

(60) Provisional application No. 61/750,377, filed on Jan. 9, 2013.

(51) Int. Cl.
| | |
|---|---|
| *H04W 4/00* | (2009.01) |
| *H04L 12/12* | (2006.01) |
| *G06Q 20/38* | (2012.01) |
| *G07F 9/00* | (2006.01) |
| *G06Q 20/20* | (2012.01) |
| *H04W 84/12* | (2009.01) |

(52) U.S. Cl.
CPC .............. *H04L 12/12* (2013.01); *G06Q 20/202* (2013.01); *G06Q 20/387* (2013.01); *G07F 9/006* (2013.01); *H04W 84/12* (2013.01)

(58) Field of Classification Search
USPC ......... 370/338, 332, 311, 329, 252, 235, 341, 370/348, 312, 331; 455/418, 419, 411, 455/67.1, 426.1, 574, 422, 434
See application file for complete search history.

(56) References Cited

U.S. PATENT DOCUMENTS

| | | | | |
|---|---|---|---|---|
| 6,829,596 | B1* | 12/2004 | Frazee ............... | G06Q 20/0457 235/380 |
| 9,008,063 | B2* | 4/2015 | Cui ....................... | H04W 12/06 370/338 |
| 2012/0209991 | A1* | 8/2012 | Handa .................. | G06F 1/3209 709/224 |

* cited by examiner

*Primary Examiner* — Chi H Pham
*Assistant Examiner* — Alexander O Boakye

(57) ABSTRACT

A new table-side device is seamlessly and securely integrated to an existing (primary) Wi-Fi network within an operating environment at a restaurant location. The location includes a data management server (DMS) for managing the local operations of devices operating there. The device being installed at the location is auto-configured into the primary Wi-Fi network by being provided with a default Wi-Fi profile that only enables the device to be activated on an activation Wi-Fi network also available at the location. Once the device activates to the Wi-Fi activation network, it requests activation onto the primary Wi-Fi network from a cloud-based data center. The data center requests an activation password from the local DMS. The local DMS generates an activation bundle, which is then returned and eventually instantiated on the device to complete the activation. Once activated, the device updates its Wi-Fi profile to now executed on the primary Wi-Fi network.

17 Claims, 13 Drawing Sheets

SECURE WIRELESS NETWORK-BASED ACTIVATION FOR TABLE-SIDE INFORMATION AND POINT-OF-SALE DEVICES

BACKGROUND

1. Technical Field

This disclosure relates generally to mechanisms for installation, administration and maintenance of promotion/pay-at-the-table devices that are used in restaurant and hospitality environments.

2. Background of the Related Art

A system of digital promotion/pay-at-the-table devices is known in the prior art. One such commercial system is the Ziosk, available from Tabletop Media, LLC, of Dallas Tex.

A Ziosk® device typically is implemented as an apparatus that comprises, within a self-contained housing, a display, a reader, a printer, electronics, and a battery. The housing is configured to position the display to a patron seated at a serving area for order data entry, display of information, and invoicing. A server computer is communicatively coupled to the apparatus over a wireless link and is adapted to transmit a control program to the apparatus, and to transmit the information. A control program executing on the apparatus facilitates order entry, order management, point-of-sale system integration, and pay-at-the-table processing. During the payment workflow, an invoice is displayed, a payment (e.g., via credit card, gift card, pre-paid card or debit card) is received and processed, and the invoice is printed.

The installation, activation and maintenance of such devices is a complex task, as these devices (and their control systems) are typically added or retrofitted to or within existing restaurant/hospitality environments in which other wireline and wireless systems and infrastructure are already present. The pay-at-the-table devices must be installed, tested and operated in a seamless and secure manner, and without disruption to existing systems within the local operating environment. Once installed, there may be a need to re-activate the devices periodically or, upon occasion, to de-activate a particular device and take it out of service. These tasks must be carried out with as little interruption to the existing activities at the restaurant/hospitality environment in which they are occurring.

BRIEF SUMMARY

A new table-side device is seamlessly and securely integrated to an existing (primary) Wi-Fi network within an operating environment at a restaurant location. The location includes a data management server (DMS) for managing the local operations of devices operating there. The device being installed at the location is auto-configured into the primary Wi-Fi network by being provided with a default Wi-Fi profile that only enables the device to be activated on an activation Wi-Fi network also available at the location. Once the device activates to the Wi-Fi activation network, it requests activation onto the primary Wi-Fi network from a cloud-based data center. The data center requests an activation password from the local DMS. The local DMS generates an activation bundle, which is then returned and eventually instantiated on the device to complete the activation. Once activated, the device updates its Wi-Fi profile and can then execute on the primary Wi-Fi network going forward. Preferably, the DMS verifies that the device is still permitted on the primary Wi-Fi network upon each daily power-up of the device, and procedures are provided to de-activate the device from the primary Wi-Fi network as needed.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

As noted above, a system of digital promotion/pay-at-the-table devices is known in the prior art. One such commercial system is the Ziosk, available from Tabletop Media, LLC, of Dallas Tex. As noted above, a Ziosk® device typically is implemented as a standalone apparatus that comprises, within a self-contained housing, a display, a reader, a printer, electronics, and a battery. The housing is configured to position the display to a patron seated at a serving area for order data entry, display of information, and invoicing. A server computer (not shown) is communicatively coupled to the apparatus, typically over a wireless link, and it is adapted to transmit a control program to the apparatus, and to transmit the information. A control program executing on the apparatus facilitates the invoicing by selectively displaying an invoice on the display, receiving a payment, and providing an indication that a payment has been accepted.

Figure 1:
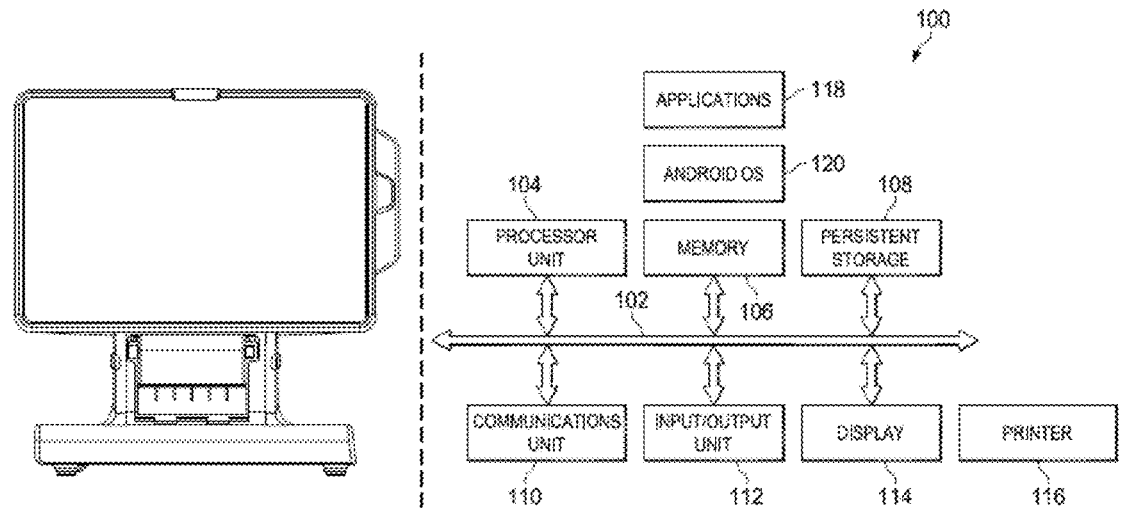
FIG. 1 is a representation of a known table-side device and its control hardware and software.

FIG. 1 illustrates a representative architecture for the device 100, which includes a communications bus 102, which provides communications among a processor 104, memory 106, persistent storage 108, communications unit 110, input/output (I/O) unit 112, display 114, and printer 116. The processor 104 executes instructions for software that may be loaded into memory 106 (e.g., from persistent storage 108). The memory 106 and persistent storage 108 are storage devices. The communications unit 110 provides for communications with other data processing systems or devices. In these examples, communications unit 110 is a network interface card, or it may provide communications through the use of either or both physical and wireless communications links. The input/output unit 112 allows for input and output of data with other devices that may be connected to data processing system 100. For example, input/output unit 212 may provide a connection for user input through touch screen, through voice activation, or some other man-machine interface (MMI). Further, input/output unit 112 may send output to the printer 116. Display 114 provides a mechanism to display information to a user. Instructions for the operating system 116 (e.g., Android) and applications or programs 118 are located on persistent storage 108. These instructions are selectively loaded into memory 106 for execution by processor 104.

Figure 2:
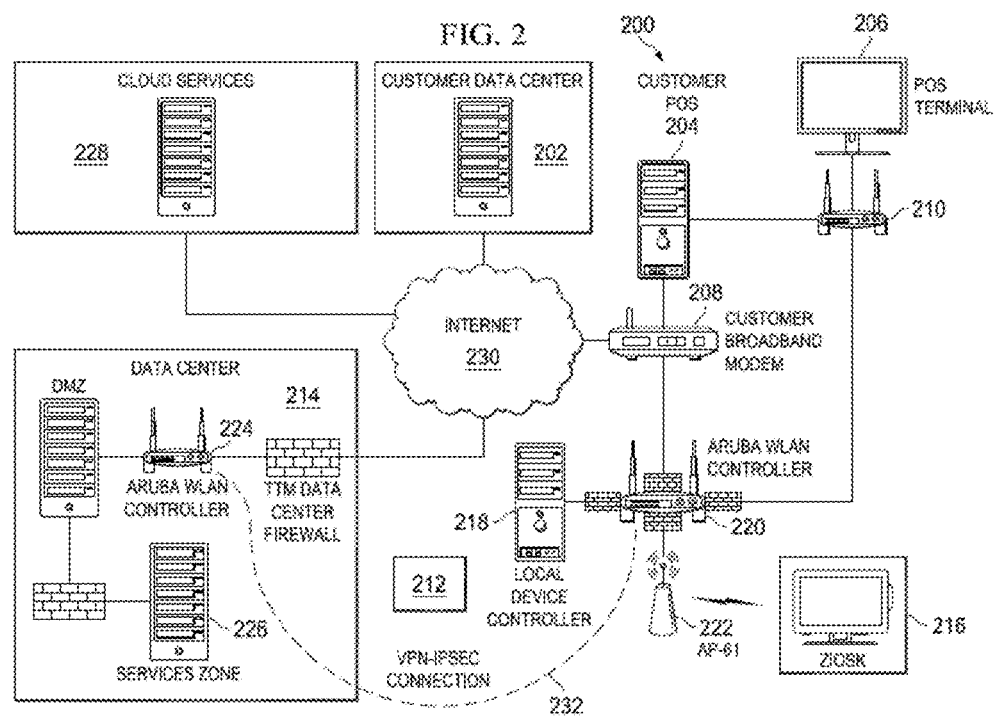
FIG. 2 is a block diagram of a service provider's table-side system integrated with a host point-of-sale (POS) system according to this disclosure.

FIG. 2 shows a representative network for an overall system that, in a typical operating scenario, includes a set of the table-side devices 100 located in a facility (or even across multiple such facilities. A service provider (referred to as "TTM" for convenience) provides various networking, hardware and software resources and services to support the devices within the restaurant (the "customer"). In general, the overall system is broken into several portions, namely, the customer's equipment, the service provider's equipment, and other third party services. More specifically, the customer's equipment 200 typically includes a customer data center 202 (which may be located off-premises), a customer point-of-sale (POS) system 204, one or more POS terminals 206, and various networking and switching resources such as DSL modem 208 and switch 210. The customer's infrastructure also may include a name service, HTTP and FTP servers, administrative servers, data collection services, management and reporting servers, other backend servers, load balancing appliances, other switches, and the like (not shown). Each machine typically comprises sufficient disk and memory, as well as input and output devices. On the other hand, the service provider's equipment 212 typically comprises a service provider data center 214 located remotely, and various on-site equipment, namely, the table-side devices 216, a local device controller 218, and various wireless networking resources such as WLAN controller 220 and base stations 222 (e.g., an Aruba AP-61, with 802.11 b/g protocol support). The local device controller operates a proxy server as part of an overall content management sub-system that keeps the table unit software and content updated. The content management sub-system periodically polls the external service provider infrastructure (e.g., a content management system therein) for updates. Once an update has been located, it is retrieved to the local device controller where it is stored until the table units are ready (e.g., charged or otherwise available, or if it is otherwise time for the scheduled content to be loaded therein). As the units are charged, the update is downloaded or installed. These updates can range from new menu items to firmware/device operating software upgrades.

As illustrated, the table-side devices 216 communicate wirelessly to the WLAN controller 220 (a wireless router, such as an Aruba 800-4 mobility controller) through the base stations, using known protocols such as 802.11. The service provider data center 214 typically supports various servers, such as a content management server 224, and an administration server 226. The data center 214 may also include a name service, HTTP and FTP servers, administrative servers, data collection services, management and reporting servers, other backend servers, load balancing appliances, other switches and modems, and the like. The service provider systems also may interoperate with applications supported in a third party hosted environment 228, such as Amazon® S3 or the like. As is well-known, cloud computing using an environment 228 is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Communications among the various systems are facilitated using IP-based networks, such as the public-routable Internet 230, private VPN-IPSEC connections 232, other known or later-developed wireless and/or wireline protocols, and the like.

Generalizing, various components shown in FIG. 2 may be co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Referring back to FIG. 2, as described, the equipment used by the customer is the customer POS system 204 and associated network connection (e.g., 208, 210). The customer's network connection is then connected to the wireless router 220, which is a central hub of the service provider local (in-restaurant) system. The router 220 communicates with the local device controller 218, the service provider data center 214 and other devices and systems, such as shown. The local device controller 218 typically is a machine on which various application programs execute, as will be described. One of the programs provides local content management and control for the various table-side units. The wireless router 220 (and its associated access point 222) is the link to the table-side units 216 throughout the restaurant or other hospitality area being serviced. The local device controller 218 preferably stores the content and data that is synchronization with the units 216. The communication link between a unit 216 and its associated local device controller 218 enable each in-restaurant unit to remain up-to-date, and to provide the data center 214 components with the usage and health of the individual units.

The customer POS server 204 may also communicate with the content controller routines operative in the local device controller 218.

Secure Wireless Network-Based Activation and Management for Devices

With the above as background, the techniques of this disclosure are now described.

As will be described, the solution described herein allows for any table-side device to be added to a wireless network location seamlessly and securely, and without requiring knowledge about the specifics of the underlying wireless network. In operation, the device preferably just prompts for an activation code to facilitate activation. The system then provides the device with all of the activation material to connect the device to the wireless network of the local operating environment into which the device is being activated and to identify the new device in the environment. Preferably, the device arrives at the local operating environment for installation and activation and is activated by having a user enter the activation code.

Figure 3:
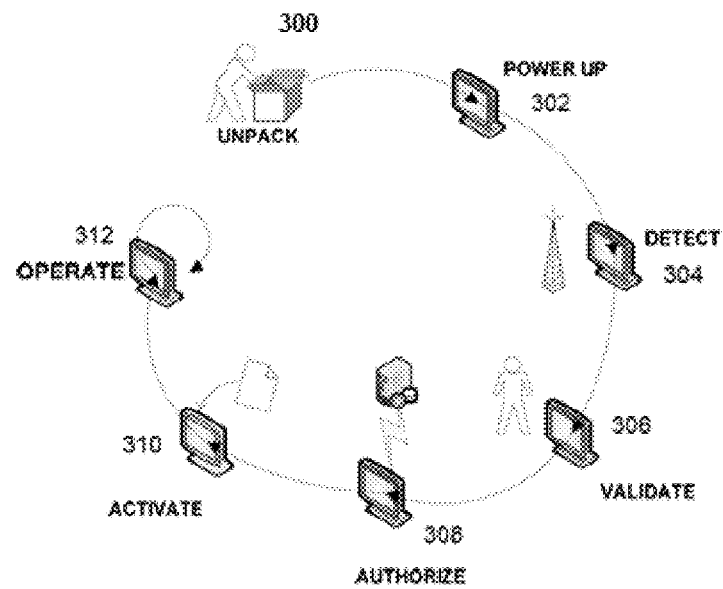
FIG. 3 illustrates a block diagram of an activation process for a table-side device according to this disclosure.

In particular, it is assumed that the service provider (or a delegate) facility and service center provides devices. According to this disclosure, a device is provided with a default wireless profile configured on the device. The default wireless profile allows the devices to be activated at any local operating environment (e.g. a restaurant location), preferably irrespective of the secure primary Wi-Fi configuration at the environment. As illustrated in FIG. 3, once the device arrives at the local operating environment, it is unpacked at step 300, powered-up at step 302, detected at step 304, validated at step 306, authorized at step 308, activated at step 310, and then operated at step 312. According to this disclosure, the activation process the table device preferably requires that the device is assigned an activation code and activation password. The activation code and password are the credentials that allow a device to activate on the Wi-Fi network and download the WiFi specific configuration details. As will be seen below, a device that require Wi-Fi activation presents the user with an activation display screen that prompts the user to enter an activation credential. Typically, the user is prompted for basic information to authorize the device activation. For example, the device prompts the user for a restaurant code (or user number) and a user password, and to select an option to activate the device. The restaurant code (or user number) and the user password together comprise an activation credential. The restaurant (or user number) is the "activation code."

Preferably, the activation code for a particular device is generated by a cloud-based content management system (CMS) and then provided to the user for manual entry on the device to initiate the activation process. The activation password for the device is generated by an on-premises data management system (DMS). Note that the "user password" received in the device to initiate the activation workflow is distinct from the activation password that is generated by the DMS during the activation process.

This separation (the CMS being used to generate the activation code, and the DMS being used to generate the activation password) is preferred, but not intended to be limiting.

Figure 4:
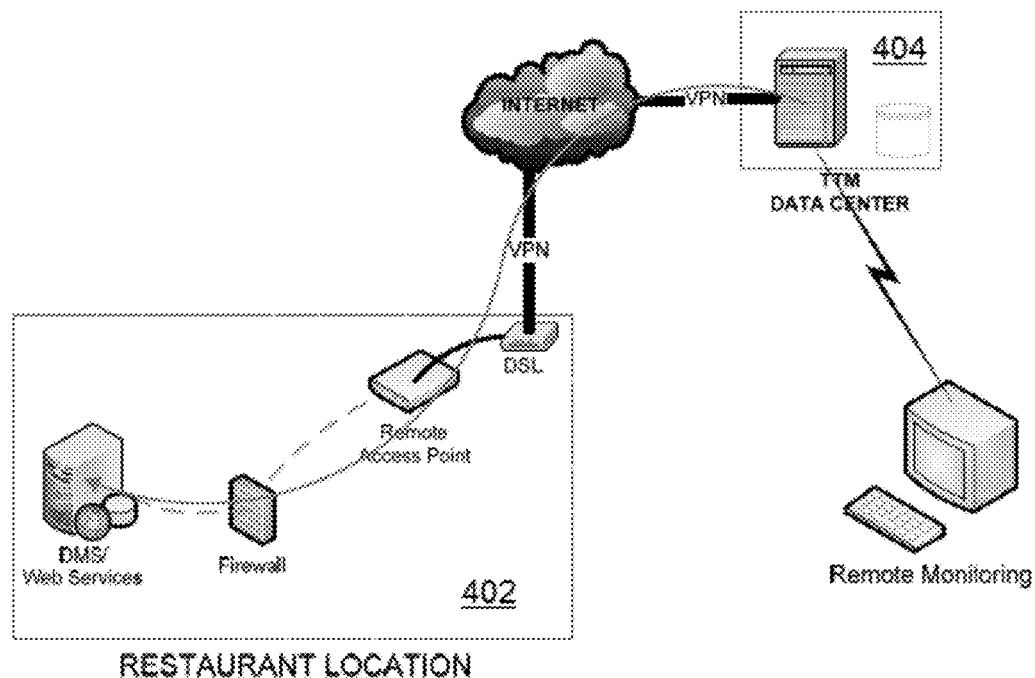
FIG. 4 illustrates a technique for generating activation codes for the table-side devices.

FIG. 4 illustrates an activation code generation process that is used to generate the activation code for the device being installed and activated. Preferably, activation codes are generated by a web interface on a cloud-based content management system (CMS) that is associated with the service provider at a data center 404. The CMS provides for the ability to define activation codes and assign them to the specific restaurant locations. Preferably, and as noted above, the CMS does not generate the activation passwords, yet requests the activation code to be accepted by DMS at the local operating environment 400, and DMS makes a local record and stores the activation code and generates the activation password. Preferably, RADIUS user credentials for the device are not created at this time; rather, they are created during the device activation. Although any technique may be used, preferably the activation code generation is done using a CMS web interface that exposes a web page that allows for activation code generation from the CMS level. As noted, the activation code generated is further communicated down to DMS to request the activation code be accepted, after which DMS generates and stores the activation password.

In general, the solution uses and enforces activation codes and activation passwords to control and manage device activations. Preferably, all activation requests and responses are encrypted, and check digits are used on the codes and passwords for additional security. The table device is configured for automated activation provided it receives an activation code and activation password. The table device preferably establishes and maintains network connections, preferably through XML profiles on the device. The table device has the capability to present an activation screen for easy activation code entry. The device may implement check digit validation on the activation code and activation password to trap data entry errors.

The CMS maintains a list of the allowable activation codes and the identity of the restaurant location for the activation code is valid. Preferably, an activation code only maps to a single restaurant. The CMS also maintains a list of black-listed devices that are not allowed to activate, and it may also maintain a data when black-listed devices try to re-activate to allow for alarms and reporting. Preferably, the CMS provides a web-based interface for activation code generation and restaurant targeting; CMS makes a web request to DMS for the password to be generated for a given activation code. Preferably, the CMS does not know the activation password generated by DMS. CMS may also provide a web interface to de-activate an activated table device.

DMS, which manages local operations, generates and maintains the activation passwords for the devices. DMS maintains a list of allowable activation codes and activation passwords valid for its location. Preferably, DMS encrypts the activation materials for the device based upon the activation password that it generates and that corresponds to the activation code. The DMS also preferably maintains a current state of devices that are in the process of being activated. DMS provides a web interface to take requests from CMS to generate activation details, but it need not report the generated activation password to the CMS. When an activation response bundle is being generated (as will be described), preferably DMS makes a query/interface call to generate and manage RADIUS (or other AAA) server user accounts. When a table-side device is de-activated the RADIUS user account is de-activated and removed.

The activation code and activation password ensure that the device activation is secure. Preferably, the code and password are short-lived for additional security. Preferably, the activation code and activation password employ a check digit algorithm to verify data entry at the device. The activation code check digit only validates the entry of the activation code, and the activation password only validates the entry of the activation password. As noted, preferably CMS assigns the activation code to a restaurant DMS.

Figure 5:
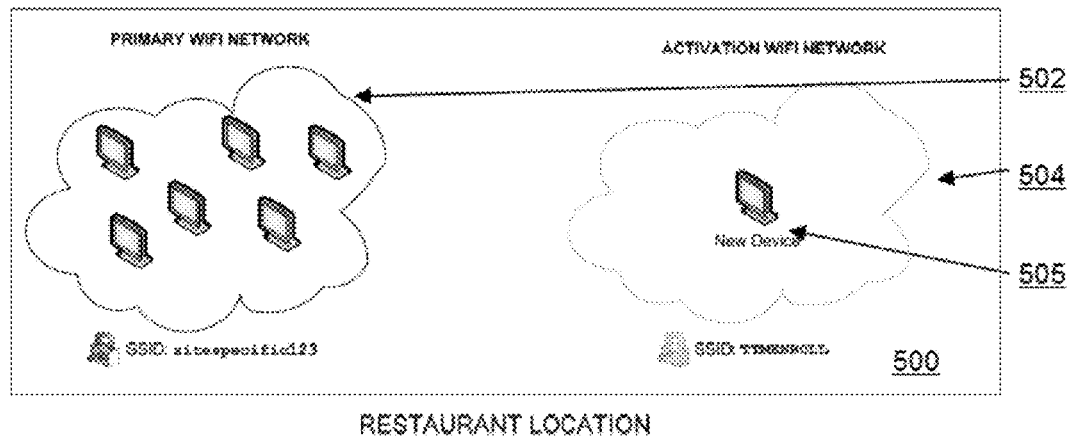
FIG. 5 illustrates a basic activation operation according to this disclosure by which a device is activated into the operating network.

With the above predicate, the following now describes the high-level activation operation. According to this disclosure, and with reference to FIG. 5, the device wireless auto-configuration assumes there are two (2) distinct Wi-Fi networks:

a primary Wi-Fi network 502, and an activation Wi-Fi network 504. The primary Wi-Fi network 502 is one in which the credentials (for that network) are unknown by the device, and the activation Wi-Fi network 504 is one in which the credentials (for that network) are known by the device and, in particular, for which the device already has an existing (default) configuration profile. FIG. 5 illustrates the scenario where the device 500 is being added to operate within the restaurant location 500 and, in particular, the primary Wi-Fi network 502 operating therein.

The use of "Wi-Fi" should not be construed as limiting, as the techniques herein may be used irrespective of the wireless protocol implemented within the local operating environment. The techniques may be used with managed or unmanaged table devices.

The primary (or "first") Wi-Fi network 502 is the day-to-day operational Wi-Fi network for the table-side devices. The devices use the primary Wi-Fi network to communicate with the DMS, corporate server, local point-of-sale (POS) system, and more. Preferably, the Primary Wi-Fi network credentials are only known at the restaurant location and not exposed, tracked, recorded or maintained by the centralized service provider data center (or other cloud-based infrastructure). In contrast, the activation Wi-Fi network 504 preferably is only used when a new device 505 has arrived at the restaurant location 500 and needs to be activated. Devices connecting to the activation (or "second") network 504 preferably are restricted such they can only access a single service at the data center (namely, obtaining information necessary for activation) and cannot access any other resources at the restaurant location 500. Preferably, when the device is powered-up, it automatically connects to the activation network 504 to request authentication on the primary Wi-Fi network 502.

Figure 6:
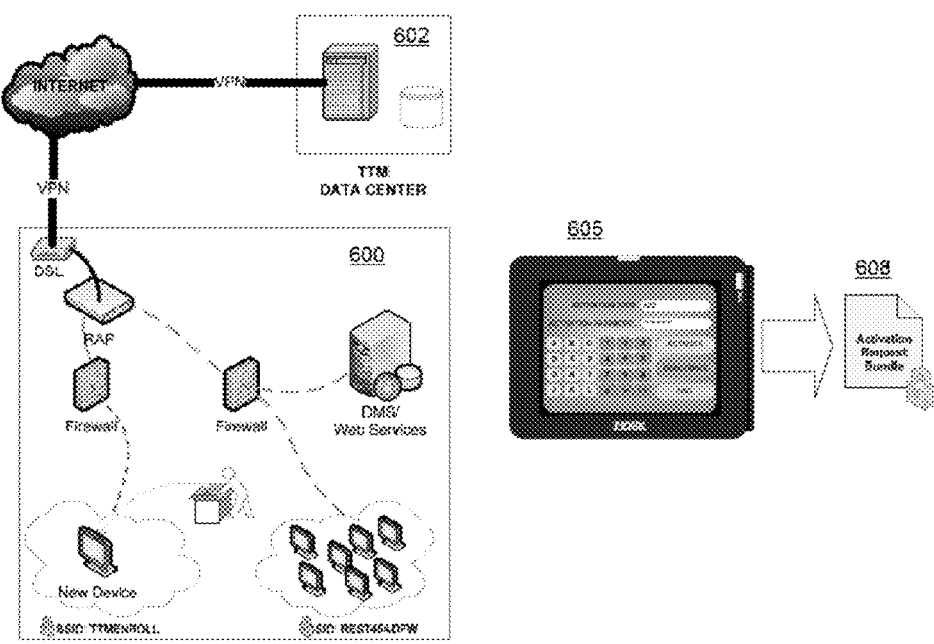
FIG. 6 illustrates an initial phase of the activation operation when the device arrives at the installation location.

FIG. 6 illustrates the new device arrival process at the restaurant location 600. Once the pay-at-the-table device arrives (from the provider), the default Wi-Fi profile configuration enables the device to connect to the activation Wi-Fi network (called SSID:TTMENROLL). The device powers-up and determines it is not activated and then prompts the user for the activation code and activation password. FIG. 6 illustrates the device display interface, which includes an activation display screen having appropriate fields for entry or receipt of such data. The user selects "Activate," an "activation request" bundle 608 is generated and passed to the data center 602.

Figure 7A:
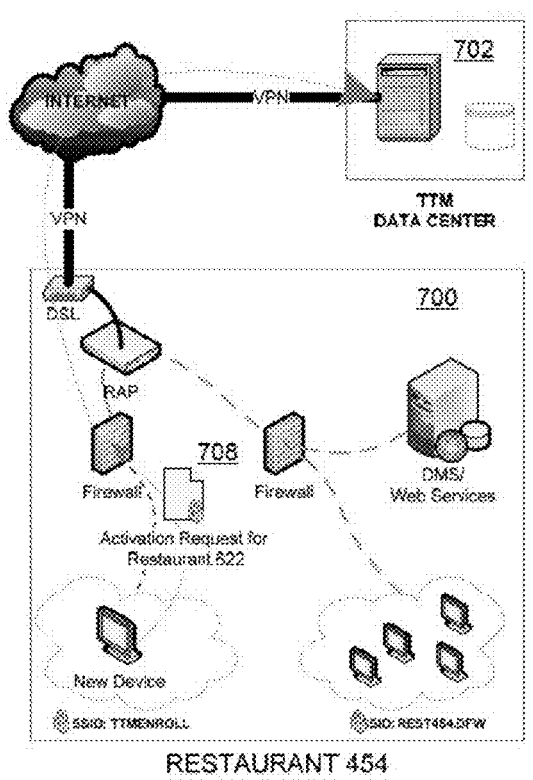
FIG. 7A-7B illustrates an activation request being provided to the service provider data center in connection with the activation operation.
Figure 7B:
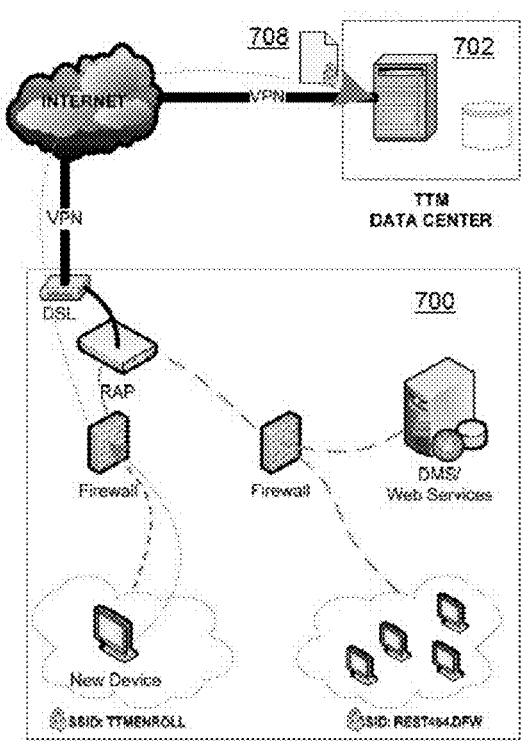

FIG. 7A-7B illustrates the initial flow for the activation request. Here, the new device operating on the activation network is being activated so that it can be operated in the primary Wi-Fi network (SSID:REST454DFW). To this end, once the user has selected "Activate," on the display screen, an activation request bundle 708 is generated and passed from the restaurant 700 to the data center 702. The activation request bundle 708 typically is an XML-formatted document delivered over a HTTPS-based Web service or transport. In this scenario, the data center 702 acts as a proxy to the various restaurant locations. The data center 702 makes the determination of which restaurant the device should be activated, and preferably this determination is made based upon the activation code within the activation request bundle. Once the activation message is received by the data center, as shown in FIG. 7B, the data center determines the restaurant routing and invokes a web service call on the appropriate DMS server there. Preferably, the data center only parses the activation bundle to act on the activation code to determine the routing.

Figure 8A:
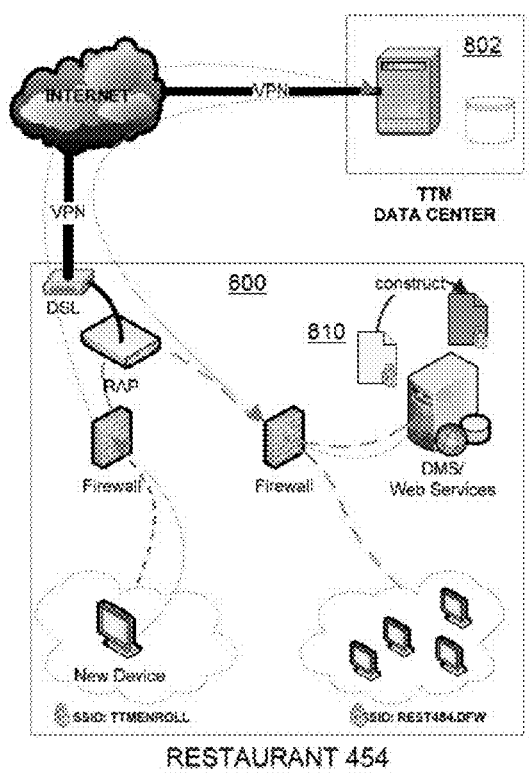
FIG. 8A-8B illustrates the service provider data center routing and acceptance of the activation request.
Figure 8B:
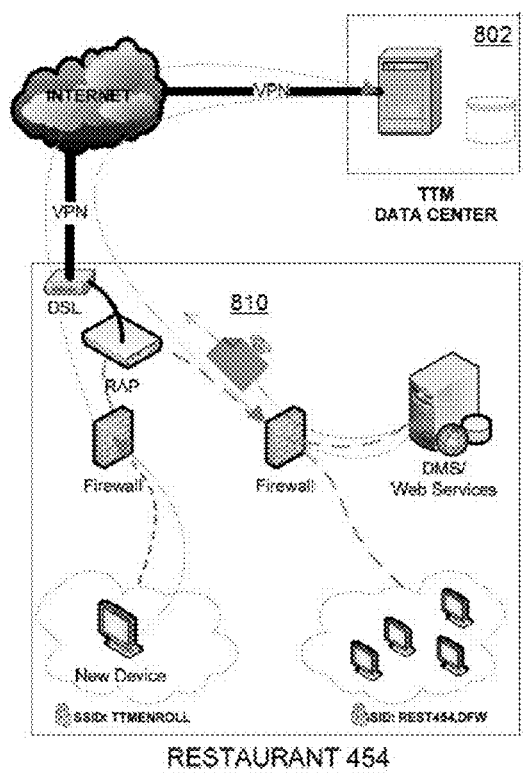

The activation workflow then continues as shown in FIG. 8A-8B. As shown in FIG. 8A, once the DMS at the restaurant location decrypts the activation request and validates that the request is valid, the DMS gathers the activation material 810 to return the data center 802 to relay back to the device being activated. As shown in FIG. 8B, the activation bundle 810 is returned to the data center 802, preferably as a return value on the DMS web service call. This allows for the routing of the activation bundle to reach the new device.

Figure 9A:
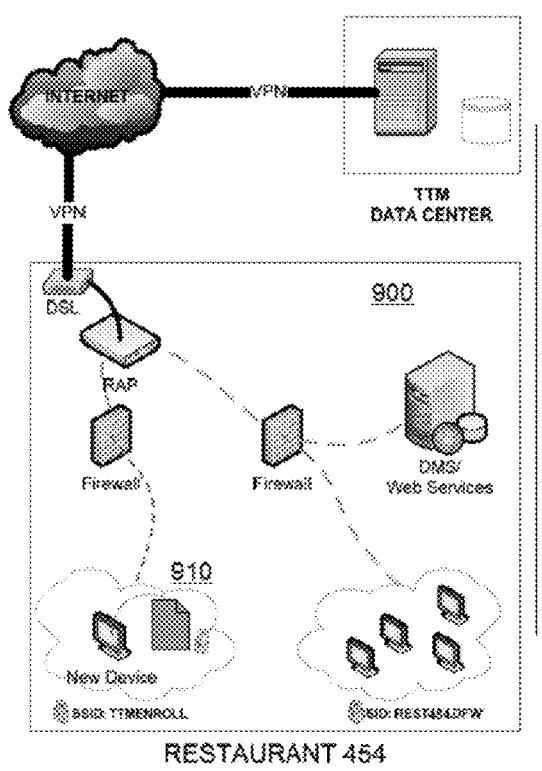
FIG. 9A-9B illustrates the delivery of an activation bundle and the installation of a new profile on the device during the activation operation.
Figure 9B:
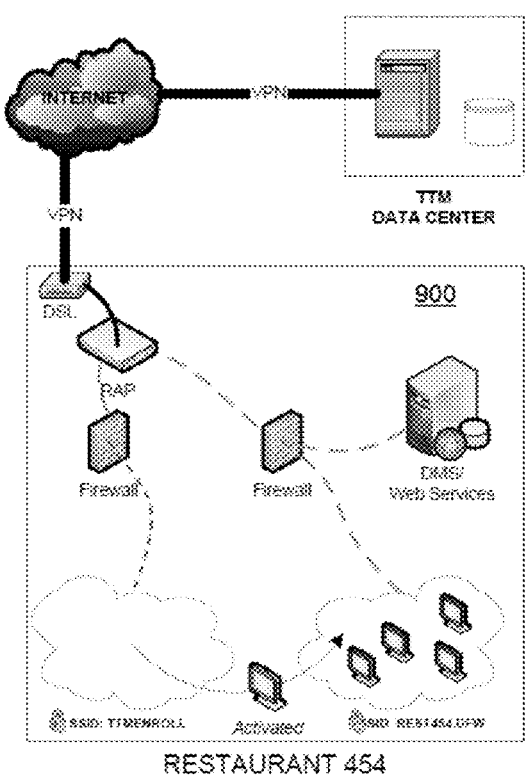

The activation workflow then continues as shown in FIG. 9A-9B with the activation bundle consumption and, in particular, the service provider data center taking the returned activation bundle and returning the data back to the calling device. FIG. 9A shows the device at the restaurant location 900 receiving the activation bundle 910. Once the device receives the activation bundle 910, it decrypts the content and verifies the bundle is valid. The device extracts the Wi-Fi profile (in this case now for the primary Wi-Fi network) out of the activation bundle and selects the profile as its default Wi-Fi profile. FIG. 9B illustrates that once the device consumes the new Wi-Fi profile, it device switches over to the primary Wi-Fi network and becomes part of the group of activated table-side devices on that network.

Figure 10A:
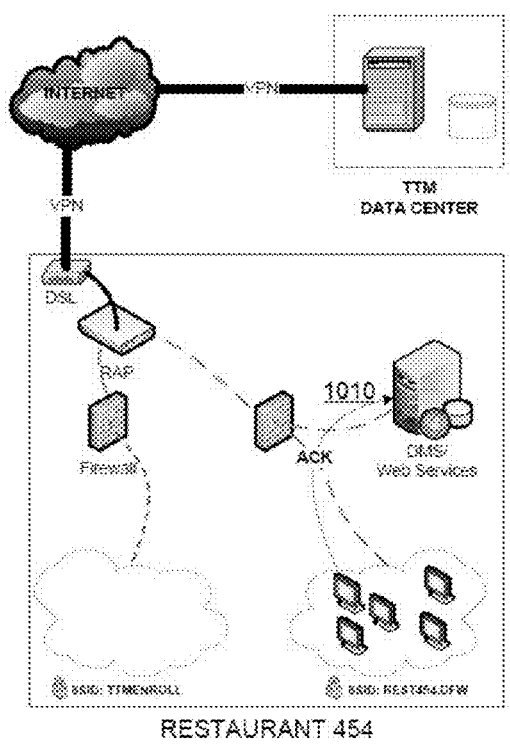
FIG. 10A-10B illustrates an activation confirmation operation to enable the now-activated device to switch from an activation network to a primary network on which it will operate in the local operating (e.g., restaurant) environment.
Figure 10B:
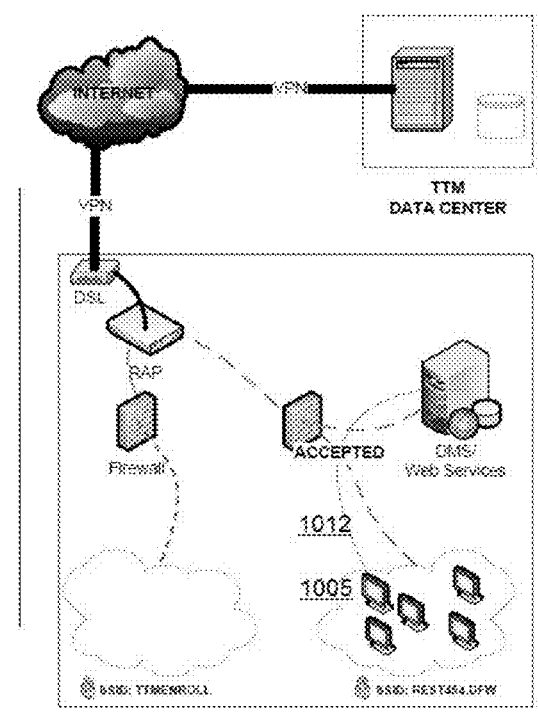

FIG. 10A-10B illustrates the final portion of the activation workflow. At FIG. 10A, and once the device is switched over to the primary Wi-Fi network, it invokes a web method to report its connection status 1010 to DMS. At FIG. 10B, the web method typically responds with an Accepted message 1012 (if the activation workflow was followed). At this point, the activation workflow is complete and the device is activated for use on the primary Wi-Fi network. If DMS denies the connection status for any reason, then the device invokes an automatic deactivation.

Figure 11:
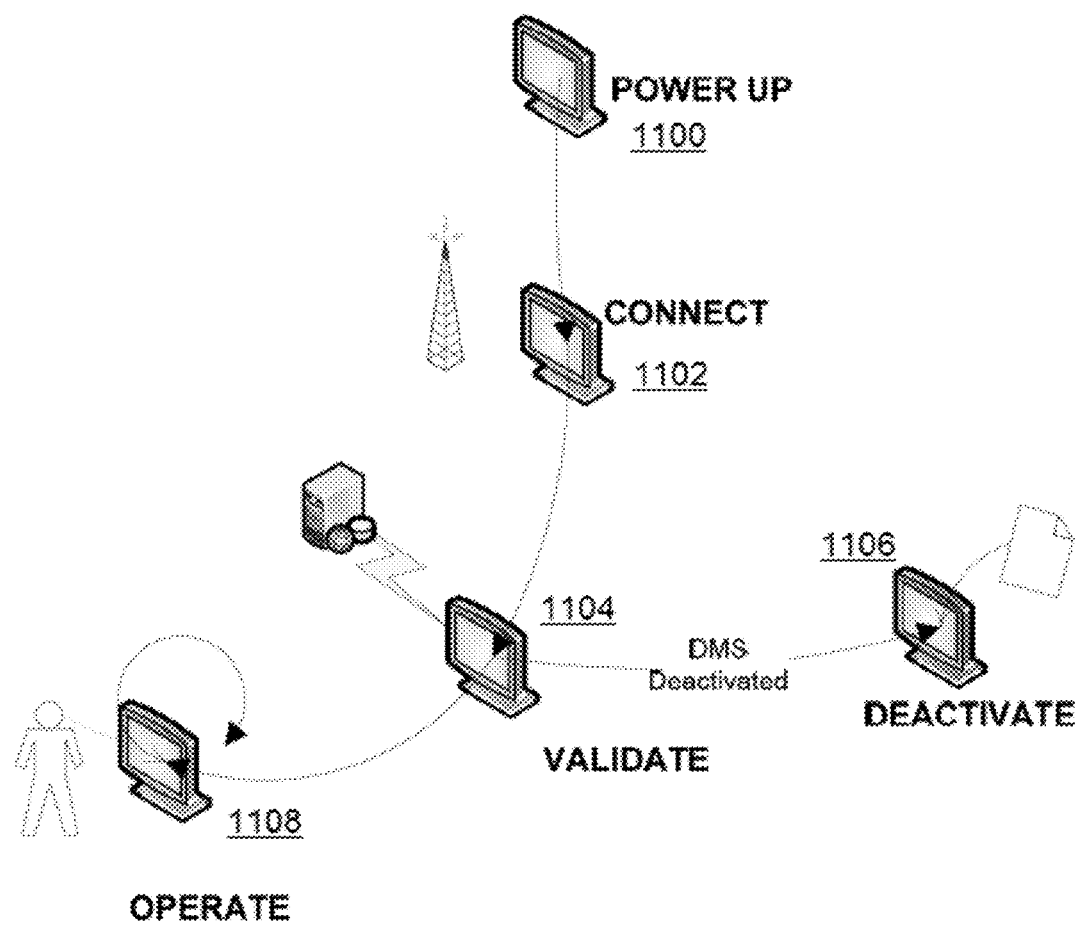
FIG. 11 illustrates a daily power-up and validation operation for the device once activated into the local operating environment.

Preferably, the device also connects to this same DMS web service during each device startup to make sure it has not been deactivated from the data center, e.g., when it was powered off or its operation otherwise disrupted. FIG. 11 illustrates a representative daily power-up and validation of the device. As noted, preferably the device performs validation against the DMS to verify that the device is still allowed on the primary Wi-Fi network. At step 1100, the device is powered-on. Once powered up, the device connects to the current Wi-Fi profile (in this case now the primary Wi-Fi). This is step 1102. At step 1104, the above-described web method is invoked to validate if the device should continue operating. If the device is informed by DMS that it should not operate, it will deactivate and then wait for re-activation. This is step 1106. If the device is informed by DMS that it should remain activated, the device continues with the normal operation of a POST sequence (as will be shown below in more detail). This is step 1108.

Figure 12:
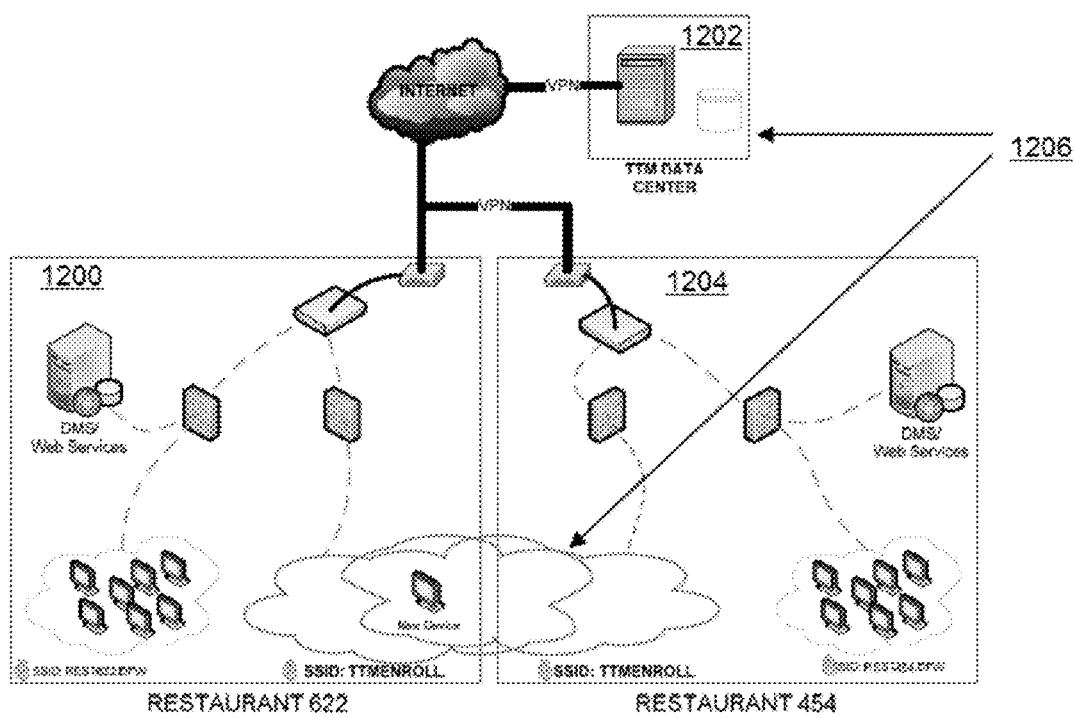
FIG. 12 illustrates how a device is activated into a particular operating environment that is located in close proximity to one another such environment.

FIG. 12 illustrates a representative activation scenario when a device is being activated in a restaurant location 1200 having a primary Wi-Fi network operating in close proximity to another location 1204 having a different primary Wi-Fi network, both of which being managed by the data center 1202. In this scenario, the Wi-Fi activation network 1206 may be common across the two networks. In most cases, the closest access point (AP) will be the AP to which the new devices associates with, and both activation networks route to the same data center 1202.

Figure 13:
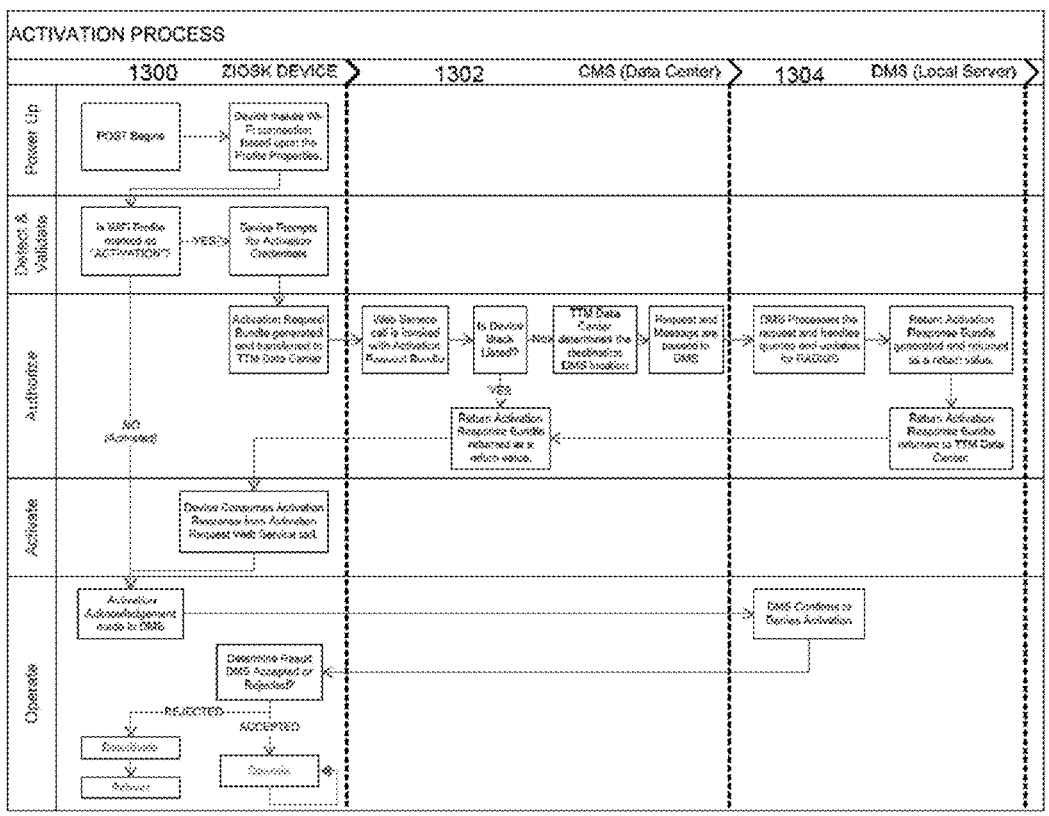
FIG. 13 illustrates the activation process in a cross-functional diagram.
Figure 14:
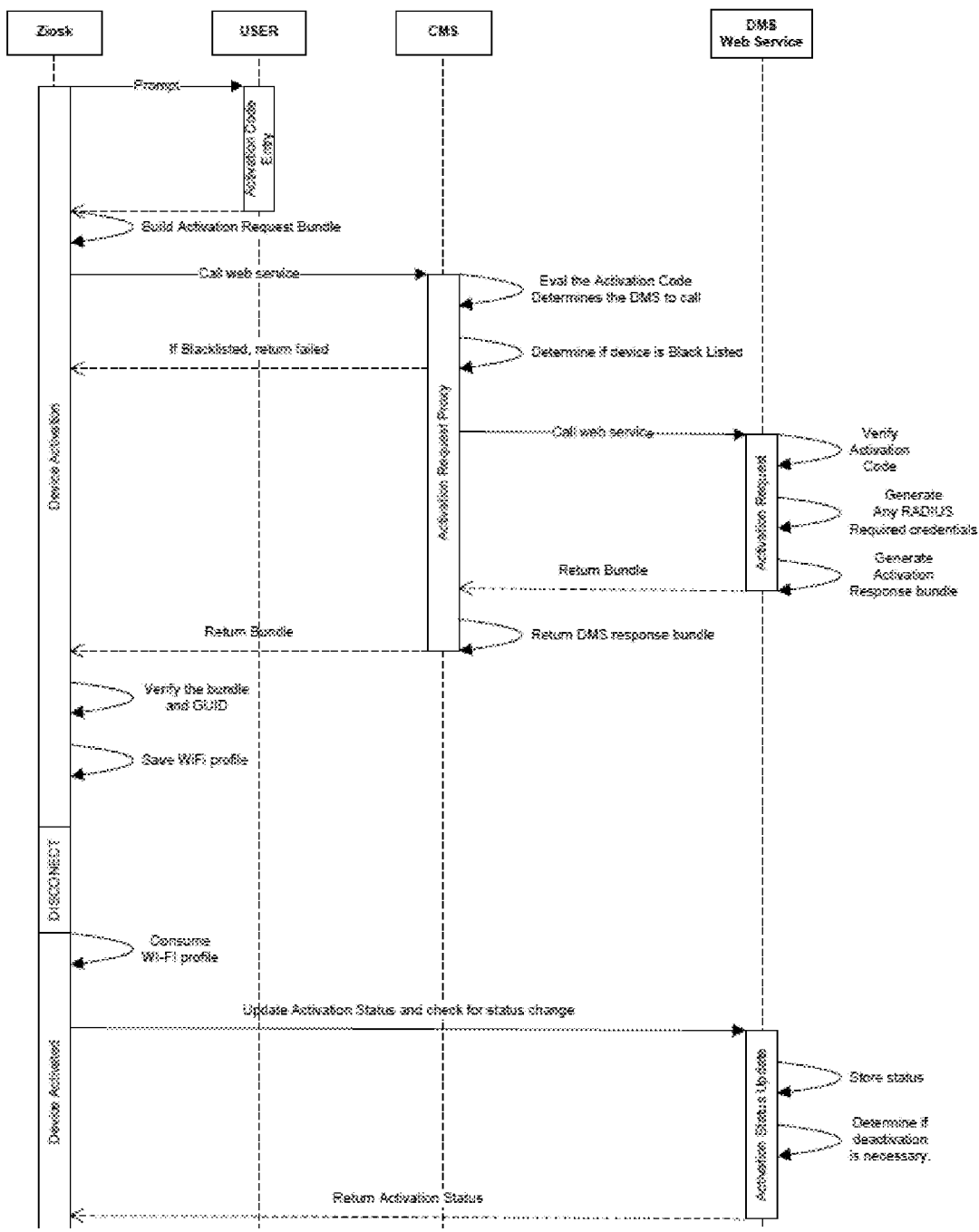
FIG. 14 illustrates the activation process as a UML sequence.
Figure 15:
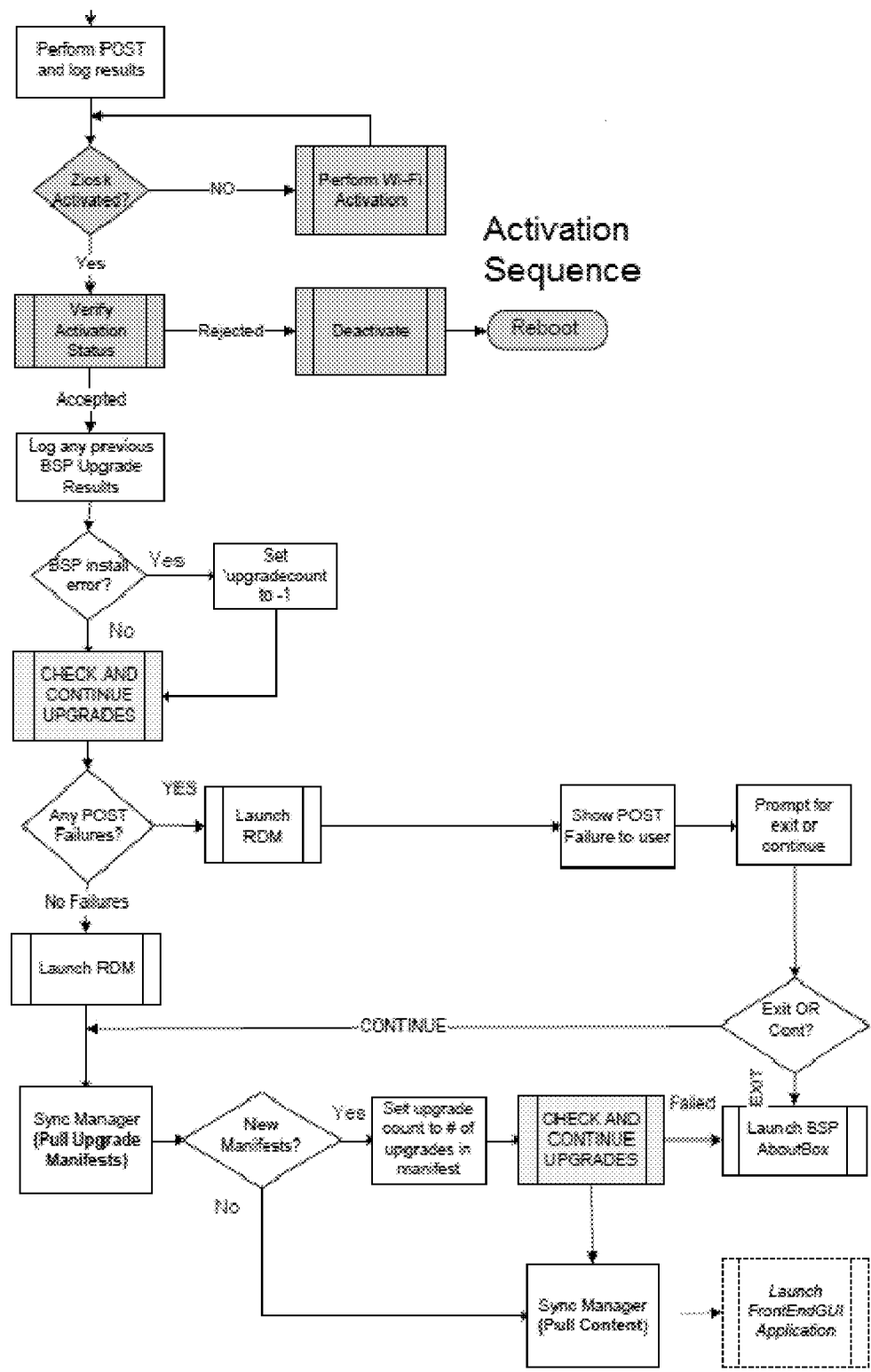
FIG. 15 illustrates a table device startup sequence.

FIG. 13 illustrates and summarizes the above-described activation workflow process for the device 1300 as it interoperates with the CMS 1302 (at the data center), and the DMS that is co-located at the restaurant location. FIG. 14 illustrates the process in additional detail and as a UML workflow. FIG. 15 illustrates how the activation workflow sequence occurs within the context of an overall table device startup sequence. In all cases shown, the operations illustrated are the preferred steps, but they are not intended to be limiting. In FIG. 15, the highlighted operations correspond to the logic outlined in the activation flowchart shown in FIG. 13.

A device, once activated, may need to be de-activated from time-to-time. This process mainly will be done whenever a device is being removed from a restaurant location to be returned to the provider or other entity. This is not a limitation. According to this disclosure, de-activation may be initiated manually (from the device itself) or, more preferably, remotely (from the data center). The manual approach to de-activation from the wireless network is to provide a special password that brings up de-activation application/screen and allows the user to deactivate the device. Once the authorized user has done so, the device invokes a web service/method on the DMS to inform the server that a deactivation is requested. The DMS receives the request; the DMS stores records that the MAC/device is activated on the primary Wi-Fi network. The Web method is invoked and received by DMS. The MAC address is validated and the device is removed from the activated device table. User accounts and passwords setup for PEAP are updated and accounts removed. The device then clears/removes all configuration values so it no longer connects to the primary Wi-Fi network and will only connect back to an activation Wi-Fi network.

Figure 16:
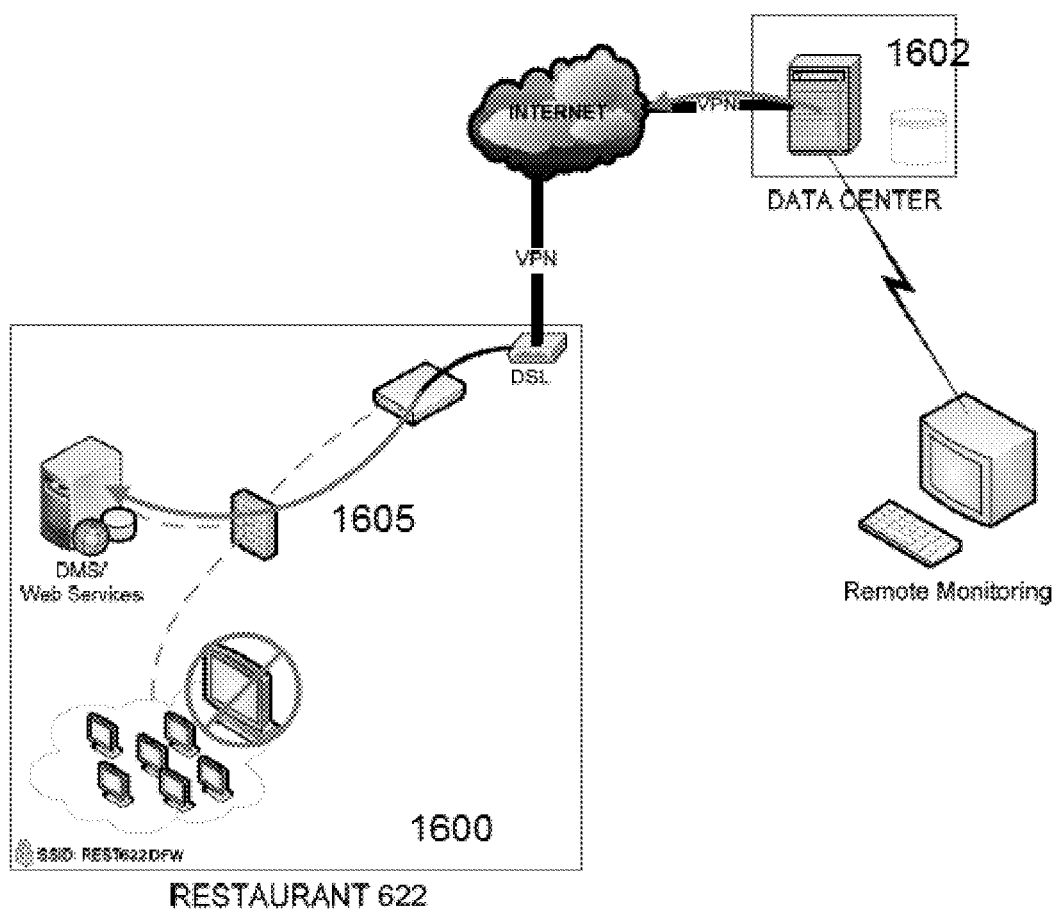
FIG. 16 illustrates a table device de-activation procedure to remove a device from operation in the local operating environment.

FIG. 16 illustrates the remote de-activation method. This procedure occurs when the data center 1602 chooses to de-activate a device. It works in the same way as the manual de-activation process, except that the web method call 1605 is made from the data center 1602 to the restaurant location 1600. One consideration here is that the device will continue to attempt a wireless connection to the primary Wi-Fi network. If this wireless network is using WPA2/PEAP or another RADIUS solution, the device will fail to login to the Wi-Fi network. If the Primary Wi-Fi network is not user/password controlled, the device will continue to make connections to the DMS. During device start-up, the device will continue to connect to the DMS during a device startup sequence. In particular, the device will communicate to the DMS asking if it is allowed on the network. If the web service responds no, then the device continues its portion of the de-activation process and removes the Wi-Fi properties.

The following provides additional details regarding the data structures that are passed among the various components during the activation workflow.

Without limitation, the activation request bundle typically is an XML document that is passed to an activation web service application programming interface (API). The table device generates the activation request bundle and populates the values from user input and from device properties. The bundle typically includes a set of values that are stored within a request data field <SECURE-REQUEST>, which preferably is a data field in the bundle that is encrypted and then BASE64 encoded. In particular, preferably the contents are encrypted with AES256 and SHA-1 hash of the activation password as the shared encryption key. Preferably, the password is not transferred from the DMS. The receiving end of the bundle must know the SHA-1 hash of the password to be able to decrypt the payload. Thus, in this workflow the activation password is used as a unique encryption key for the activation. In operation, the request data field must be decrypted to verify the password for the activation code is valid. If the decryption fails to produce the XML document, then the password used during activation is incorrect and the activation request is rejected.

The activation response bundle is an XML document generated by DMS and includes activation properties for the device and the primary Wi-Fi network configuration. The activation response bundle preferably includes an encrypted XML element within the document. In particular, an encrypted element <SECURE-PROFILE> is encrypted with the activation password that corresponds to the activation code provided in the activation request. The values stored with the encrypted element are encrypted then BASE64 encoded. The contents are encrypted with AES256 and SHA1 hash of the activation password as the shared encryption key. As noted above, preferably the password is never transferred, and the receiving end must already know the SHA-1 hash of the password to be able to decrypt the payload. Again, the activation password is used as the unique encryption key for this operation.

Preferably, each activation request and activation response XML document contains a validation code value. The validation code value is a field in the XML document that is used to determine if the document manifest is intact and valid. This field designed to help prevent from man-in-the-middle attacks on the download content. The validation code may be computed as follows. Once the activation request or activation bundle is generated (without the validation field) a hash is generated on the activation file. The hash value is then prefixed with a known signature, and the two fields are encrypted with a shared key as a single block. Once the combined fields are encrypted, the resulting binary array is inserted into the activation request/response XML document with the appropriate XML markup tags. The validation code is validated as follows. The process is the same for both the device and DMS. The application validates the XML structure is intact. It then makes a temporary copy of the XML documents (the activation request or response, as the case may be). The application removes the "validation" field from the temporary copy of the XML document and decrypts the validation field. The application determines that the decryption of the "validation" field was successful by looking for the signature that prefixes the SHA-1 hash. The application removes the XML validation field from the temporary XML document and compares the hash with the original XML document. If the decrypted hash does not match a computed hash of the XML document, then the XML document has been tampered or is corrupted. If the hash from the validation field matches the computed hash of the XML document, then the application determines the XML document has not been altered.

The device preferably can store multiple Wi-Fi profiles and provides a programmer the ability to switch from one profile to another. As noted, the profile is used in multiple places where the wireless network properties need to be defined or changed. The device implements a Wi-Fi profile schema that allows for future growth and additional Wi-Fi profiles in the event the service provider has a need to support multiple Wi-Fi SSID configurations at a single restaurant location. Preferably, Wi-Fi profiles are downloaded as part of the Wi-Fi activation, as has been described. The wireless profile is the WIFI-PROFILE that is encrypted in the SECURE-PROFILE XML element of the activation response bundle. Preferably, once the device receives this profile, it places a formatted XML header around the profile and stores the profile into a folder.

The techniques described above provide many advantages. The activation techniques here allow a device to connect to a Wi-Fi network without exposing the wireless credentials to the end user. They enable a device to connect to diverse Wi-Fi networks without having the user know anything about the network specifics or how to install custom software. They provide a single software and data installation of a device that allows the device to be used in any Wi-Fi network. The techniques provide support for all formats of Wi-Fi networks including support for RADIUS and WPA2/PEAP solutions that require additional user accounts and passwords but without the user having to know anything about the user account and password. The techniques are also quite flexible and allow for growth or changes in the local operating environment.

Preferably, each of the described functions is implemented in software, as a set of computer program instructions, executing in a single- or multi-processor hardware environment. Thus, a particular functionality may be implemented as a non-transitory computer program product (an article) comprising computer-readable media having computer program instructions thereon.

One or more functions of the technology platform as described may be implemented in a cloud-based architecture. As described, typically one or more features of the service provider data center are implemented in this manner. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like. While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

While the techniques herein have been described primarily for use at the time when a device is first being activated in a restaurant environment (or upon its daily power-on), they may also be used during other periodic security-related operations including, without limitation, changing userID and password, or changing certificates.

Having described our invention, what is claimed is as follows:

1. Apparatus to configure a table-side device into a first Wi-Fi network operative at a physical location, comprising:
a hardware processor;
computer memory that stores computer program instructions, the computer program instructions executed in the hardware processor and comprising:
program code operative upon receipt of an activation request to verify an activation code included in the activation request and to generate an activation response, the activation code having been received at the table-side device upon association of the table-side device with a second Wi-Fi network operative at the physical location and that is distinct from the first Wi-Fi network, the table-side device being restricted from associating with the first Wi-Fi network based on a default Wi-Fi profile initially configured into the table-side device;
program code to output the activation response, the activation response including a new Wi-Fi profile adapted to replace the default Wi-Fi profile upon instantiation at the table-side device to activate the table-side device for use on the first Wi-Fi network.

2. The apparatus as described in claim 1 wherein the computer program instructions further include program code to receive an activation message received from the table-side device following instantiation of the new Wi-Fi profile at the table-side device, to determine whether activation to the first Wi-Fi network is permitted, and when activation to the first Wi-Fi network is permitted, to return a response message confirming that the table-side device is permitted to associate with the first Wi-Fi network.

3. The apparatus as described in claim 2 wherein the computer program instructions are further adapted upon power-up of the table-side device to perform a validation that the table-side device is permitted continued access to the first Wi-Fi network.

4. The apparatus as described in claim 1 wherein the computer program instructions include program code to generate an activation password associated with the activation code received in the activation request.

5. The apparatus as described in claim 4 wherein the computer program instructions include program code to use encrypt at least a portion of the activation response using the activation password.

6. The apparatus as described in claim 1 wherein the computer program instructions include program code to maintain a list of allowable activation codes for table-side devices associated with the physical location, and to compare the activation code received in the activation request with the list of allowable activation codes before generating the activation response.

7. The apparatus as described in claim 1 wherein the computer program instructions further include program code operative during processing of the activation request to query an authorization and authentication server and to obtain user account information, the user account information being included in the activation response.

8. The apparatus as described in claim 1 wherein the activation request and the activation response are communicated as XML documents over a secure Web service transport.

9. A method to configure a table-side device into a first Wi-Fi network operative at a physical location, comprising:
  receiving an activation request associated with a table-side device having a default Wi-Fi profile and no other active Wi-Fi profile, the table-side device having associated with a second Wi-Fi network using the default Wi-Fi profile, the second Wi-Fi network operative at the physical location, and the default Wi-Fi profile being restricted for use except to enable association of the table-side device with the second Wi-Fi network using the default Wi-Fi profile;
  verifying an activation code included in the activation request, the activation code having been received at the table-side device upon association of the table-side device with a second Wi-Fi network using the default Wi-Fi profile; and
  upon verification, generating an activation response, the activation response including a new Wi-Fi profile adapted to replace the default Wi-Fi profile upon instantiation at the table-side device to activate the table-side device for use on the first Wi-Fi network;
  wherein at least one of the receiving, verifying and generating steps is carried out in software executing in a hardware element.

10. The method as described in claim 9 further including:
  following instantiation of the new Wi-Fi profile at the table-side device, receiving an activation message;
  making a determination whether activation to the first Wi-Fi network is permitted; and
  when activation to the first Wi-Fi network is permitted, returning a response message confirming that the table-side device is permitted to associate with the first Wi-Fi network.

11. The method as described in claim 9 further including:
  upon power-down and subsequent power-up of the table-side device, performing a validation that the table-side device is permitted continued access to the first Wi-Fi network.

12. The method as described in claim 9 wherein the step of generating an activation response includes generating an activation password associated with the activation code received in the activation request.

13. The method as described in claim 12 further including using the activation password to encrypt at least a portion of the activation response.

14. The method as described in claim 9 wherein the activation response is proxied to the table-side device through a computing entity located external to the physical location and that manages configuration of a group of table-side devices at multiple physical locations.

15. The method as described in claim 14 wherein the activation code is generated in the computing entity.

16. The method as described in claim 9 wherein the physical location is associated with a restaurant.

17. The method as described in claim 9 further including de-activating the table-side device from the first Wi-Fi network.

* * * * *